(12) United States Patent
Luo et al.

(10) Patent No.: US 7,541,396 B2
(45) Date of Patent: Jun. 2, 2009

(54) METHOD FOR MAKING CARBOXYALKYL CELLULOSE

(75) Inventors: Mengkui Luo, Auburn, WA (US); Amar N. Neogi, Kenmore, WA (US); S Ananda Weerawarna, Seattle, WA (US); Andrew J Dodd, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 426 days.

(21) Appl. No.: 11/026,291

(22) Filed: Dec. 29, 2004

(65) Prior Publication Data

US 2006/0137838 A1 Jun. 29, 2006

(51) Int. Cl.
C08B 11/00 (2006.01)
C08B 11/12 (2006.01)
C08L 1/26 (2006.01)

(52) U.S. Cl. .............................. 524/45; 524/42; 536/56; 536/84; 536/97; 536/98; 162/9; 162/157.6

(58) Field of Classification Search .................. 424/45, 424/42; 536/56, 84, 97, 98; 162/9, 157.6
See application file for complete search history.

(56) References Cited

U.S. PATENT DOCUMENTS

| | | | |
|---|---|---|---|
| 2,811,519 A | 10/1957 | Touey | |
| 3,574,818 A | 4/1971 | Takehara et al. | |
| 3,589,364 A | 6/1971 | Dean et al. | |
| 3,638,698 A | 2/1972 | Woodman et al. | |
| 3,723,413 A | 3/1973 | Chatterjee et al. | |
| 3,900,463 A | 8/1975 | Yada et al. | |
| 3,936,441 A | 2/1976 | Holst et al. | |
| 3,965,091 A | 6/1976 | Holst et al. | |
| 4,043,921 A | 8/1977 | Hessert et al. | |
| 4,063,018 A | 12/1977 | Ohnaka et al. | |
| 4,066,828 A | 1/1978 | Holst et al. | |
| 4,068,067 A | 1/1978 | Holst et al. | |
| 4,254,258 A * | 3/1981 | Durso | 536/98 |
| 4,389,513 A | 6/1983 | Miyazaki | |
| 4,418,524 A | 12/1983 | Ito et al. | |
| 4,507,474 A | 3/1985 | Raehse et al. | |
| 4,547,570 A | 10/1985 | Garner | |
| 4,615,923 A | 10/1986 | Marx | |
| 4,650,716 A | 3/1987 | Gelman | |
| 4,650,863 A | 3/1987 | Felcht et al. | |
| 4,689,408 A | 8/1987 | Gelman | |
| 4,734,478 A | 3/1988 | Tsubakimoto et al. | |
| 4,771,105 A | 9/1988 | Shirai et al. | |
| 4,783,510 A | 11/1988 | Saotome | |
| 4,972,007 A | 11/1990 | Herzog et al. | |
| 5,026,596 A | 6/1991 | Saotome | |
| 5,221,722 A | 6/1993 | Sehm | |
| 5,229,294 A * | 7/1993 | Foster | 436/8 |
| 5,247,072 A | 9/1993 | Ning et al. | |
| 5,324,823 A | 6/1994 | Asakawa et al. | |
| 5,451,296 A * | 9/1995 | Pikulin et al. | 162/241 |
| 5,470,964 A | 11/1995 | Qin | |
| 5,498,705 A | 3/1996 | Qin | |
| 5,532,221 A | 7/1996 | Huang et al. | |
| 5,550,189 A | 8/1996 | Qin et al. | |
| 5,561,114 A | 10/1996 | Komai et al. | |
| 5,562,740 A * | 10/1996 | Cook et al. | 8/120 |
| 5,668,273 A | 9/1997 | Allen et al. | |
| 5,725,601 A * | 3/1998 | Tajiri et al. | 8/120 |
| 5,731,083 A * | 3/1998 | Bahia et al. | 428/393 |
| 5,734,025 A | 3/1998 | Komai et al. | |
| 5,766,415 A * | 6/1998 | Chen | 162/65 |
| 5,792,856 A | 8/1998 | Allen et al. | |
| 5,800,418 A | 9/1998 | Ahr | |
| 5,817,713 A | 10/1998 | Pappas et al. | |
| 5,998,511 A | 12/1999 | Westland et al. | |
| 6,015,936 A | 1/2000 | Takai et al. | |
| 6,020,536 A | 2/2000 | Österdahl et al. | |
| 6,063,982 A | 5/2000 | Martin et al. | |
| 6,074,524 A * | 6/2000 | Wu et al. | 162/100 |
| 6,083,211 A | 7/2000 | DesMarais | |
| 6,107,356 A | 8/2000 | DesMarais | |
| 6,107,538 A | 8/2000 | Young et al. | |
| 6,121,409 A | 9/2000 | Mitchell et al. | |
| 6,135,987 A | 10/2000 | Tsai et al. | |
| H1909 H | 11/2000 | Ahr | |
| 6,184,271 B1 | 2/2001 | Westland et al. | |
| 6,258,208 B1 * | 7/2001 | Lindeberg et al. | 162/65 |
| 6,270,845 B1 | 8/2001 | Pappas et al. | |
| 6,271,278 B1 | 8/2001 | Park et al. | |
| 6,303,544 B1 | 10/2001 | Maas et al. | |

(Continued)

FOREIGN PATENT DOCUMENTS

CA 2072918 A1 8/1993

(Continued)

OTHER PUBLICATIONS

Rydholm, Sven, "Pulping Processes" Interscience Publishers, 1965, pp. 362, 1156.*

(Continued)

*Primary Examiner*—Eric Hug
*Assistant Examiner*—Dennis Cordray
(74) *Attorney, Agent, or Firm*—Christensen O'Connor Johnson Kindness; John M Crawford

(57) ABSTRACT

Methods for making the carboxyalkyl cellulose.

20 Claims, 4 Drawing Sheets

U.S. PATENT DOCUMENTS

| | | |
|---|---|---|
| 6,500,947 B1 | 12/2002 | West et al. |
| 6,531,593 B1 | 3/2003 | Luo et al. |
| 6,593,468 B1 | 7/2003 | Lange et al. |
| 6,602,994 B1 | 8/2003 | Cash et al. |
| 6,656,974 B1 | 12/2003 | Renn et al. |
| 6,686,464 B1 | 2/2004 | Harding et al. |
| 6,765,042 B1 | 7/2004 | Thornton et al. |
| 2002/0139496 A1 | 10/2002 | Hu et al. |
| 2003/0027787 A1 | 2/2003 | Couture et al. |
| 2004/0000012 A1 | 1/2004 | Scarpello et al. |
| 2006/0142478 A1* | 6/2006 | Luo et al. .................. 525/54.1 |

FOREIGN PATENT DOCUMENTS

| | | |
|---|---|---|
| EP | 0 566 118 B2 | 10/1993 |
| EP | 0 796 070 B1 | 9/1997 |
| WO | WO 95/11925 A1 | 5/1995 |
| WO | WO 96/15137 A1 | 5/1996 |
| WO | WO 99/20318 A2 | 4/1999 |
| WO | WO 00/27886 A1 | 5/2000 |
| WO | WO 00/39390 | 7/2000 |
| WO | WO 00/47628 A2 | 8/2000 |

OTHER PUBLICATIONS

Barbucci R et al., Swelling behavior of carboxymethylcellulose hydrogels in relation to cross-inking, pH and charge density, *Macromol 33*: 7475-7480 (2000).

Heinze et al., "Studies on the synethsus and characterization fo carboxymethylcellulose," *Die Ang Makro Chem 266*: 37-45 (1999).

Kalman et al., "Effect of the reaction condition on the degree of substitution on carboxymethyl cellulose," *Colloid Polym Sci 266*: 716-720 (1999).

Klemm et al., "Etherization of Cellulose, *Comprehensive Cellulose Cehmistry, vol. 2: Functionalization of Cellulose*," and Appendix, p. 353, Wiley-VCH (2001).

Zhang et al, "Solvent effect on carboxymethylation of cellulose," *J Appl Poly Sci 49*: 741-746 (1993).

* cited by examiner

US 7,541,396 B2

METHOD FOR MAKING CARBOXYALKYL CELLULOSE

FIELD OF THE INVENTION

The present invention relates to methods for making the carboxyalkyl cellulose.

BACKGROUND OF THE INVENTION

Personal care absorbent products, such as infant diapers, adult incontinent pads, and feminine care products, typically contain an absorbent core that includes superabsorbent polymer particles distributed within a fibrous matrix. Superabsorbents are water-swellable, generally water-insoluble absorbent materials having a high absorbent capacity for body fluids. Superabsorbent polymers (SAPs) in common use are mostly derived from acrylic acid, which is itself derived from oil, a non-renewable raw material. Acrylic acid polymers and SAPs are generally recognized as not being biodegradable. Despite their wide use, some segments of the absorbent products market are concerned about the use of non-renewable oil derived materials and their non-biodegradable nature. Acrylic acid based polymers also comprise a meaningful portion of the cost structure of diapers and incontinent pads. Users of SAP are interested in lower cost SAPs. The high cost derives in part from the cost structure for the manufacture of acrylic acid which, in turn, depends upon the fluctuating price of oil. Also, when diapers are discarded after use they normally contain considerably less than their maximum or theoretical content of body fluids. In other words, in terms of their fluid holding capacity, they are "over-designed". This "over-design" constitutes an inefficiency in the use of SAP. The inefficiency results in part from the fact that SAPs are designed to have high gel strength (as demonstrated by high absorbency under load or AUL). The high gel strength (upon swelling) of currently used SAP particles helps them to retain a lot of void space between particles, which is helpful for rapid fluid uptake. However, this high "void volume" simultaneously results in there being a lot of interstitial (between particle) liquid in the product in the saturated state. When there is a lot of interstitial liquid the "rewet" value or "wet feeling" of an absorbent product is compromised.

In personal care absorbent products, U.S. southern pine fluff pulp is commonly used in conjunction with the SAP. This fluff is recognized worldwide as the preferred fiber for absorbent products. The preference is based on the fluff pulp's advantageous high fiber length (about 2.8 mm) and its relative ease of processing from a wetlaid pulp sheet to an airlaid web. Fluff pulp is also made from renewable and biodegradable cellulose pulp fibers. Compared to SAP, these fibers are inexpensive on a per mass basis, but tend to be more expensive on a per unit of liquid held basis. These fluff pulp fibers mostly absorb within the interstices between fibers. For this reason, a fibrous matrix readily releases acquired liquid on application of pressure. The tendency to release acquired liquid can result in significant skin wetness during use of an absorbent product that includes a core formed exclusively from cellulosic fibers. Such products also tend to leak acquired liquid because liquid is not effectively retained in such a fibrous absorbent core.

A need therefore exists for a superabsorbent composition that is made from a biodegradable renewable resource like cellulose and that is cost effective. In this way, the superabsorbent composition can be used in absorbent product designs that are efficient such that they can be used closer to their theoretical capacity without feeling wet to the wearer. The present invention seeks to fulfill this need and provides further related advantages.

SUMMARY OF THE INVENTION

The invention provides methods for making carboxyalkyl cellulose. In one embodiment, the method comprises treating a pulp having a kappa value of from about 1 to about 65 with a carboxyalkylating agent to provide a carboxyalkyl cellulose. In one embodiment, the method comprises alkalizing a pulp having a kappa value of from about 1 to about 65 to provide an alkalized pulp; and etherifying the alkalized pulp with a carboxyalkylating agent to provide a carboxyalkyl cellulose. In another embodiment, the method comprises crosslinking a pulp having a kappa value of from about 1 to about 65 to provide a crosslinked pulp; alkalizing the crosslinked pulp to provide an alkalized pulp; and etherifying the alkalized pulp with a carboxyalkylating agent to provide a carboxyalkyl cellulose.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
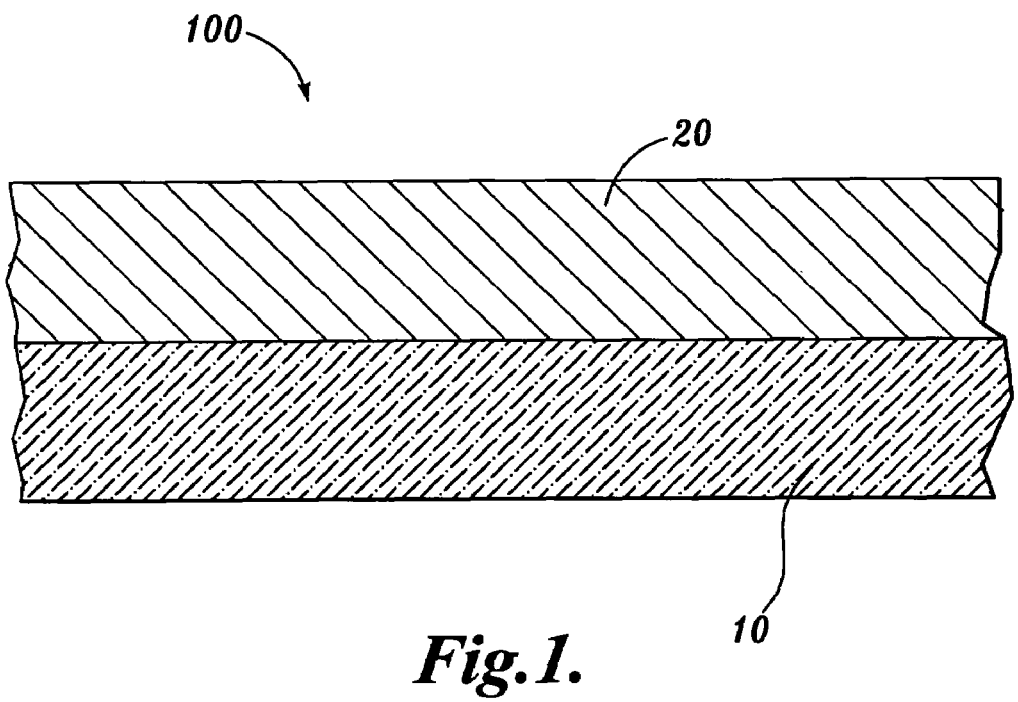
FIG. 1 is a cross sectional view of an absorbent construct incorporating a superabsorbent composition of the invention and having an acquisition layer.

In one aspect, the invention provides a carboxyalkyl cellulose. The carboxyalkyl cellulose of the invention is made from pulp having a high lignin content, high kappa value, high hemicellulose content, and high degree of polymerization compared to conventional pulps used to make carboxyalkyl cellulose. Pulps useful in making carboxyalkyl cellulose of the invention include pulps made from pulping processes that do not include a pre-hydrolysis step. Useful pulps include pulps prepared by processes having cooking times shorter and cooking temperatures lower that conventional pulping processes. Other useful pulps include pulps prepared by processes that do not include extensive bleaching stages.

The pulp from which the carboxyalkyl cellulose is made has a kappa value of from about 1 to about 65. In one embodiment, the pulp from which the carboxyalkyl cellulose is made has a kappa value of from about 2 to about 40. In one embodiment, the pulp from which the carboxyalkyl cellulose is made has a kappa value of about 35. Kappa value was determined by standard method TAPPI T-236.

In one embodiment, the pulp from which the carboxyalkyl cellulose is made is a kraft pulp.

In one embodiment, the carboxyalkyl cellulose is a carboxymethyl cellulose. In one embodiment, the carboxyalkyl cellulose is a carboxyethyl cellulose.

The carboxyalkyl cellulose of the invention is made from a pulp having a lignin content of from about 0.15 to about 10 percent by weight based on the weight of the cellulose. Lignin content was determined by the methods described in Examples 6 and 7.

The carboxyalkyl cellulose of the invention is made from a pulp having a hemicellulose content of from about 0.1 to about 17 percent by weight based on the weight of the cellulose. Hemicellulose content was determined by the methods described in Examples 6 and 7.

The carboxyalkyl cellulose of the invention is derived from unbleached or lightly bleached pulps. Unbleached and lightly bleached pulps include celluloses, hemicelluloses, and lignins. Therefore, products of the invention derived from unbleached or lightly bleached pulps may include carboxyalkyl hemicelluloses and carboxyalkyl lignins, in addition to carboxyalkyl celluloses.

The carboxyalkyl cellulose of the invention is made from a pulp having a degree of polymerization of from about 1200 to about 3600. Degree of polymerization was determined by standard method ASTM D1795.

The carboxyalkyl cellulose of the invention has a degree of carboxyl substitution of from about 0.4 to about 1.4. Degree of carboxy substitution was determined by titration.

A 1 percent by weight aqueous solution of the carboxyalkyl cellulose of the invention has a viscosity greater than about 100 cP. In one embodiment, a 1 percent by weight aqueous solution of the carboxyalkyl cellulose of the invention has a viscosity greater than about 600 cP. In one embodiment, a 1 percent by weight aqueous solution of the carboxyalkyl cellulose of the invention has a viscosity greater than about 1000 cP. In one embodiment, a 1 percent by weight aqueous solution of the carboxyalkyl cellulose of the invention has a viscosity greater than about 2000 cP. In one embodiment, a 1 percent by weight aqueous solution of the carboxyalkyl cellulose of the invention has a viscosity greater than about 4000 cP. Viscosity was determined by standard method ASTM D2196-99.

The carboxyalkyl cellulose of the invention has a Free Swell Capacity of at least about 20 g/g. In one embodiment, the carboxyalkyl cellulose has a Free Swell Capacity of from about 20 g/g to about 80 g/g. Free Swell Capacity was determined by the method described in Example 4.

The carboxyalkyl cellulose of the invention has a Centrifuge Capacity of at least about 10 g/g. In one embodiment, the carboxyalkyl cellulose has a Centrifuge Capacity of from about 10 g/g to about 50 g/g. Centrifuge Capacity was determined by the method described in Example 4.

The carboxyalkyl cellulose of the invention has an Absorbency Under Load (AUL) value of at least about 5 g/g. In one embodiment, the carboxyalkyl cellulose has an Absorbency Under Load value of from about 5 g/g to about 20 g/g. Absorbency Under Load value was determined by the method described in Example 5.

In one embodiment, the carboxyalkyl cellulose is a water-soluble carboxyalkyl cellulose, comprising a pulp treated with an amount of carboxyalkylating agent sufficient to provide a carboxyalkylated pulp having a degree of carboxy substitution from about 0.4 to about 1.4.

In one embodiment, the carboxyalkyl cellulose is a crosslinked, water-soluble carboxyalkyl cellulose. The crosslinked, water-soluble carboxyalkyl cellulose comprises is a pulp treated with an amount of carboxyalkylating agent sufficient to provide a carboxyalkylated pulp having a degree of carboxy substitution from about 0.4 to about 1.4, and treated with an amount of a crosslinking agent sufficient to maintain the carboxylalkyl cellulose soluble in water. In one embodiment, the invention provides a water-soluble carboxyalkyl cellulose, comprising a crosslinked pulp treated with an amount of carboxyalkylating agent sufficient to provide a carboxyalkylated pulp having a degree of carboxy substitution from about 0.4 to about 1.4. In another embodiment, the invention provides a water-soluble carboxyalkyl cellulose, comprising a carboxyalkylated pulp having a degree of carboxy substitution from about 0.4 to about 1.4 treated with an amount of a crosslinking agent sufficient to maintain the carboxyalkylated pulp soluble in water.

In the above embodiments, the pulp from which the carboxyalkyl cellulose is made has a kappa value of from about 1 to about 65.

A general method for making a representative carboxymethyl cellulose of the invention is described in Example 1. Representative procedures for making carboxymethyl cellulose of the invention are described in Examples 2 and 3.

The properties of carboxymethyl celluloses of the invention, pulp from which the carboxymethyl celluloses are made, and commercially available carboxymethyl celluloses are compared in Tables 1 and 2 below.

In Table 1, the kappa value, sugar composition, degree of carboxy substitution (DS), viscosity for 1 percent by weight aqueous solutions, and color of carboxymethyl celluloses for the carboxymethyl celluloses of the invention (Entries A1-O1), carboxymethyl cellulose prepared by the method of the invention from a fully bleached southern pine pulp (NB416) and fully bleached spruce pulp (PA), and commercially available carboxymethyl celluloses are compared. Entry CMC (250,000) and CMC (700,000) refer to carboxymethyl celluloses commercially available from Aldrich Chemical Co. (Milwaukee, Wis.) having molecular weights of 250,000 and 700,000, respectively. Entry CMC 9H4F refers to a carboxymethyl cellulose commercially available under the designation AQUALON from Hercules Corp., Hopewell, Va.

TABLE 1

Carboxymethyl cellulose properties.

| Pulp | CMC properties | | HPLC sugar/solid method, wt % | | | | CMC solution viscosity, 100 rpm | | 0.01% CMC Color |
|------|------|-------|-------|--------|--------|------|---------------|------|-------|
| | CMC | Kappa | Xylan Wt % | Mannan Wt % | lignin Wt % | DS | concentration Wt % | cP | |
| A1 | H | | 0.66 | 0.87 | 0.32 | 0.92 | 0.82 | 140 | |
| A1a | I | | 0.16 | 0.05 | 0.60 | 1.09 | 0.82 | 296 | |

TABLE 1-continued

Carboxymethyl cellulose properties.

| Pulp | CMC properties CMC | Kappa | HPLC sugar/solid method, wt % Xylan Wt % | Mannan Wt % | lignin Wt % | DS | CMC solution viscosity, 100 rpm concentration Wt % | cP | 0.01% CMC Color |
|---|---|---|---|---|---|---|---|---|---|
| A1 | 75 | 2.4 | 0.08 | 0.08 | 0.1 | 0.92 | 0.82 | 1420 | 12 |
| B1 | 77 | 4.7 | 0.34 | 0.06 | 1.5 | 0.94 | 0.81 | 2284 | 28 |
| C1 | 78 | 5.0 | 0.19 | 0.28 | 0.7 | 0.93 | 0.81 | 4000 | 18 |
| D1 | 79 | 18.4 | 1.34 | 0.541 | 4.39 | 0.89 | 0.79 | 800 | 5 |
| E1 | 80 | 20.6 | 1.31 | 0.493 | 3.79 | 0.90 | 0.79 | 900 | 5 |
| F1 | 81 | 20.9 | 1.32 | 0.505 | 4.39 | 0.91 | 0.80 | 1120 | 8 |
| G1 | 82 | 19.9 | 1.22 | 0.441 | 3.17 | 0.91 | 0.82 | 880 | 6 |
| H1 | 83 | 17.9 | 1.27 | 0.528 | 3.14 | 0.88 | 0.80 | 812 | 7 |
| I1 | 84 | 17.4 | 1.39 | 0.526 | 3.09 | 0.89 | 0.80 | 1020 | 7 |
| J1 | 95 | 16.9 | 0.60 | 0.38 | 2.53 | 0.97 | 0.82 | 1040 | 5 |
| K1 | 96 | 13.6 | 0.46 | 0.01 | 2.88 | 0.92 | 0.82 | 1200 | 5 |
| L1 | 97 | 16.3 | 0.41 | 0.01 | 3.51 | 0.95 | 0.79 | 1800 | 5 |
| M1 | 98 | 23.4 | 1.07 | 0.22 | 4.47 | 0.98 | 0.84 | 1800 | 5 |
| N1 | 93 | 1.48 | 0.95 | <0.01 | 0.78 | 1.00 | 0.82 | 720 | 5 |
| O1 | 94 | 3.53 | 1.13 | <0.01 | 0.45 | 0.96 | 0.84 | 1280 | 5 |
| NB416 | J | | 3.38 | 2.17 | 0 | | 0.95 | 100 | <5 |
| PA | control | | 1.12 | 0.55 | 0 | 0.93 | 0.82 | 560 | <5 |
| CMC (250000) | | | | | | 1.2 | 0.85 | 224 | <5 |
| CMC (700000) | | | | | | 0.9 | 0.85 | 2080 | <5 |
| CMC 9H4F | | | | | | 0.9 | 0.82 | 1840 | <5 |

Referring to Table 1, CMC H, I, and J were prepared by the method described in Example 3, and CMC 75 to 98 and control (from PA) were prepared by the method described in Example 1.

The properties of pulps useful in making the carboxymethyl celluloses in Table 1 are summarized in Table 2. Table 2 summarizes the bleaching sequence, kappa value, ISO brightness, and sugar content for these pulps. Entry A1 starts with kraft cooked spruce pulp having a kappa of 62.4 and degree of polymerization (DP) of 2284. Entries A1a-I1 start with kraft cooked spruce pulp having a kappa of 47.0 and degree of polymerization (DP) of 2453. Entries J1-M1 start with kraft cooked pine pulp having a kappa of 37.7 and degree of polymerization (DP) of 2327. Entries N1 and O1 start with kraft cooked mixed southern hardwoods pulp having a kappa of 10.8 and degree of polymerization (DP) of 1918.

TABLE 2

Pulp properties.

| Pulp | Pulp source Species | Bleach | Pulp properties Kappa | DP | Brightness ISO | HPLC sugar/solid, wt % Xylan | Mannan | lignin |
|---|---|---|---|---|---|---|---|---|
| A1 | Spruce | CEc(10) | 3.4 | 2599 | 22.0 | | | |
| A1a | Spruce | CEc(10) | 4.2 | 2590 | 26.2 | 2.54 | 3.69 | 0.5 |
| B1 | Spruce | CEc(18)X | 10.1 | >2462* | 48.0 | 3.26 | 4.22 | 2.5 |
| C1 | Spruce | CEc(10)X | 7.7 | >2672* | 37.7 | 2.64 | 4.01 | 3.1 |
| D1 | Spruce | DEbX | 33.4 | 2339 | | 7.64 | 5.3 | 8.91 |
| E1 | Spruce | DEbx | 34.5 | 2049 | | 7.76 | 5.28 | 7.97 |
| F1 | Spruce | DEx | 34.3 | 2029 | | 7.74 | 5.22 | 7.75 |
| G1 | Spruce | DEb | 35.1 | 2217 | | 7.73 | 5.23 | 7.45 |
| H1 | Spruce | DEbEb | 32.1 | 2409 | | 7.83 | 5.29 | 6.4 |
| I1 | Spruce | DEbEbX | 30.5 | 2367 | | 7.84 | 5.39 | 6.42 |
| J1 | Pine | DEc(10) | 26.4 | 2326 | | 3.4 | 5.09 | 7.33 |
| K1 | Pine | DEc(10)Xp | 24.8 | 2388* | | 3.36 | 5.0 | 4.99 |
| L1 | Pine | DEc(10)X | 27.8 | ** | | 3.35 | 5.48 | 4.88 |
| M1 | Pine | Ex | 40.9 | ** | | 6.9 | 4.92 | 8.41 |
| N1 | Mixed | E(10) | 5.4 | 2037 | | 4.77 | 0.30 | 1.93 |
| O1 | Mixed | E(10)X | 6.9 | 2216 | | 6.77 | 0.25 | 1.58 |

In Table 2, the single asterisk (*) refers to pulps that were not completely soluble in Cuen and the double asterisk (**) refers to pulps that were less than 50% soluble in Cuen. In Table 2, the bleaching stage abbreviations are: C=1 to 10% NaClO$_2$ (on pulp, weight) treatment at 20 to 40° C. for 0.5 to 2 hours; Ec(#)=cold NaOH treatment at 3 to 25% (weight) concentration at 5 to 40° C. from 0.1 to 1 hours (#=NaOH concentration), Eb=hot NaOH treatment (NaOH from 1 to 15% weight on pulp, NaBH4 from 0.1 to 1% on pulp) at 50 to 120° C. from 0.25 to 2 hours, if there is no NaBH$_4$, it is a E stage); D=ClO$_2$ treatment (ClO$_2$ from 0.2 to 3% wt on pulp) at 40 to 90° C. from 0.2 to 3 hours; X=crosslinking treatment with DCP (1,3-dichloro-2-hydroxypropanol) at 0.5 to 4% weight on pulp at 40 to 120° C. from 0.2 to 2 hours at pH>7; and Xp=crosslinking treatment with PEGDE (polyethylene diglycidyl ether) at 0.5 to 4% weight on pulp at 40 to 120° C. from 0.2 to 2 hours at pH>7.

In another aspect of the invention, methods for making carboxyalkyl cellulose are provided. In the methods, a pulp having a kappa value of from about 1 to about 65 is treated with a carboxyalkylating agent to provide a carboxyalkyl cellulose.

In general, the a pulp having a kappa value of from about 1 to about 65 is converted to a carboxyalkyl cellulose by treatment with a carboxyalkylating agent. In one embodiment, the pulp is crosslinked prior to carboxyalkylation. In one embodiment, the pulp is crosslinked during carboxyalkylation. In one embodiment, the carboxyalkyl cellulose is crosslinked after carboxyalkylation.

In one embodiment, the method comprises alkalizing a pulp having a kappa value of from about 1 to about 65 to provide an alkalized pulp; and etherifying the alkalized pulp with a carboxyalkylating agent to provide a carboxyalkyl cellulose.

In another embodiment, the method comprises crosslinking a pulp having a kappa value of from about 1 to about 65 to provide a crosslinked pulp; alkalizing the crosslinked pulp to provide an alkalized pulp; and etherifying the alkalized pulp with a carboxyalkylating agent to provide a carboxyalkyl cellulose.

In certain embodiments of the methods, the pulp is a never-dried pulp. As noted above, the pulp has a lignin content of from about 0.15 to about 10 percent by weight of the cellulose; and a hemicellulose content of from about 0.1 to about 17 percent by weight of the cellulose.

The carboxyalkyl cellulose has a degree of carboxy substitution from about 0.4 to about 1.4.

The methods of the invention include carboxyalkylating the pulp with a carboxyalkylating agent. Suitable carboxyalkylating agents include chloroacetic acid and its salts, 3-chloropropionic acid and its salts, and acrylamide.

In certain embodiments of the invention, the carboxyalkyl cellulose is a crosslinked carboxyalkyl cellulose made by crosslinking with a crosslinking agent. Suitable crosslinking agents useful in making the carboxyalkyl celluloses of the invention are generally soluble in water and/or alcohol.

Crosslinking agents that are useful in crosslinking before or during carboxylation include urea-based crosslinking agents such as methylolated ureas, methylolated cyclic ureas, methylolated lower alkyl substituted cyclic ureas, methylolated dihydroxy cyclic ureas, dihydroxy cyclic ureas, and lower alkyl substituted cyclic ureas. Specific preferred urea-based crosslinking agents include dimethylol urea (DMU, bis[N-hydroxymethyl]urea), dimethylolethylene urea (DMEU, 1,3-dihydroxymethyl-2-imidazolidinone), dimethyloldihydroxyethylene urea (DMDHEU, 1,3-dihydroxymethyl-4,5-dihydroxy-2-imidazolidinone), dimethylolpropylene urea (DMPU), dimethylolhydantoin (DMH), dimethyldihydroxy urea (DMDHU), dihydroxyethylene urea (DHEU, 4,5-dihydroxy-2-imidazolidinone), and dimethyldihydroxyethylene urea (DMeDHEU, 4,5-dihydroxy-1,3-dimethyl-2-imidazolidinone).

Other suitable crosslinking agents include diepoxides such as, for example, vinylcyclohexene dioxide, butadiene dioxide, and diglycidyl ether; sulfones such as, for example, divinyl sulfone, bis(2-hydroxyethyl)sulfone, bis(2-chloroethyl) sulfone, and disodium tris(β-sulfatoethyl)sulfonium inner salt; and diisocyanates.

Other suitable crosslinking agents include 1,3-dichloro-2-propanol, epichlorohydrin, divinyl sulfone, and dihalosuccinic acids.

Mixtures and/or blends of crosslinking agents can also be used.

For embodiments of the carboxyalkyl cellulose that are crosslinked with a crosslinking agent, a catalyst can be used to accelerate the crosslinking reaction. Suitable catalysts include acidic salts, such as ammonium chloride, ammonium sulfate, aluminum chloride, magnesium chloride, and alkali metal salts of phosphorous-containing acids.

The amount of crosslinking agent applied to the cellulose will depend on the particular crosslinking agent and is suitably in the range of from about 0.01 to about 8.0 percent by weight based on the total weight of cellulose. In one embodiment, the amount of crosslinking agent applied is in the range from about 0.20 to about 5.0 percent by weight based on the total weight of cellulose. In one embodiment, the amount of crosslinking agent applied to the cellulose is suitably the amount necessary to render the cellulose substantially insoluble in water. In another embodiment, the amount of crosslinking agent applied to the cellulose is suitably the amount necessary to preserve solubility of the carboxyalkyl cellulose in water.

In another aspect of the invention, superabsorbent compositions are provided. The superabsorbent compositions are obtainable by treating a carboxyalkyl cellulose (e.g., a water-soluble carboxyalkyl cellulose) and a water-soluble polymer with a crosslinking agent to provide a reaction mixture, and crosslinking the reaction mixture to provide the composition. In the composition, the water-soluble carboxyalkyl cellulose is obtained from pulp having a kappa value of from about 1 to about 65.

Suitable carboxyalkyl celluloses include carboxymethyl celluloses and carboxyethyl celluloses.

Suitable water-soluble polymers include synthetic water-soluble polymers. As used herein, the term "synthetic" refers to a polymer that is made by chemical synthesis (e.g., polyacrylic acid or polyacrylamide) and is not a naturally-occurring polymer (e.g., cellulose).

Representative water-soluble polymers include polyacrylic acid polymers, polymaleic acid polymers, polyaspartic acid polymers, copolymers of acrylic acid and acrylamide, copolymers of acrylic acid and maleic acid, copolymers of maleic acid and itaconic acid, partially-hydrolyzed polyacrylamide polymers, and mixtures thereof. In one embodiment, the water soluble polymer is a polyacrylic acid. Suitable polyacrylic acid polymers include polyacrylic acids having a variety of molecular weights. Exemplary polyacrylic acid polymers have the following molecular weights: 450,000; 750,000; 1,250,000, 3,000,000; and 4,000,000.

Representative water-soluble polymers include polyacrylamide polymers. In one embodiment, the water-soluble polymer is a polyacrylamide. Suitable polyacrylamide polymers include polyacrylamides having a variety of molecular weights. Exemplary polyacrylamide polymers have the following molecular weight ranges: 5,000,000 to 6,000,000, and 11,000,000 to 14,000,000.

Other representative water-soluble polymers include polyvinyl alcohol (PVA), polyoxyethylene (PEG), polyoxypropylene, and a polyoxyethylene/polyoxypropylene block copolymer.

The composition can be made from mixtures of water-soluble polymers.

In one embodiment, the water-soluble polymer is a polyacrylic acid. In one embodiment, the water-soluble polymer is a polyacrylamide.

In the composition, the water-soluble polymer is present in an amount from about 5 to about 65 percent by weight based on the total weight of the polymer and carboxyalkyl cellulose.

As noted above, the superabsorbent composition is obtained by treating a carboxyalkyl cellulose and a water-soluble polymer with a crosslinking agent to provide a reaction mixture, and then crosslinking the reaction mixture.

Suitable crosslinking agents include crosslinking agents that are reactive toward carboxylic acid groups. Representative organic crosslinking agents include diols and polyols, diamines and polyamines, diepoxides and polyepoxides, polyoxazoline functionalized polymers, and aminols having one or more amino groups and one or more hydroxy groups. Representative inorganic crosslinking agents include polyvalent cations and polycationic polymers. Exemplary inorganic crosslinking agents include aluminum chloride, aluminum sulfate, and ammonium zirconium carbonate with or without carboxylic acid ligands such as succinic acid (dicarboxylic acid), citric acid (tricarboxylic acid), butane tetracarboxylic acid (tetracarboxylic acid). Water soluble salts of trivalent iron and divalent zinc and copper can be used as crosslinking agents. Clay materials such as Kaolinite and Montmorrillonite can also be used for crosslinking polycarboxylated polymers. Titanium alkoxides commercially available from DuPont under the designation TYZOR can be used to form covalent bonds with polymer carboxyl and/or hydroxyl groups.

Mixtures of crosslinking agents can be used.

Representative diol crosslinking agents include 1,4-butanediol and 1,6-hexanediol.

Representative diamine and polyamine crosslinking agents include polyether diamines, such as polyoxypropylenediamine, and polyalkylene polyamines. Suitable polyether diamines and polyether polyamines are commercially available from Huntsman Corp., Houston, Tex., under the designation JEFFAMINE. Representative diamines and polyamines (e.g., tri-, tetra-, and pentaamines) include JEFFAMINE D-230 (molecular weight 230), JEFFAMINE D-400 (molecular weight 400), and JEFFAMINE D-2000 (molecular weight 2000); JEFFAMINE XTJ-510 (D-4000) (molecular weight 4000), JEFFAMINE XTJ-50 (ED-600) (molecular weight 600), JEFFAMINE XTJ-501 (ED-900) (molecular weight 900), and JEFFAMINE XTJ-502 (ED-2003) (molecular weight 2000); JEFFAMINE XTJ-504 (EDR-148) (molecular weight 148); JEFFAMINE HK-511 (molecular weight 225); and ethylenediamine, diethylenetriamine, triethylenetetraamine, and tetraethylenepentaamine.

Representative diepoxide crosslinking agents include vinylcyclohexene dioxide, butadiene dioxide, and diglycidyl ethers such as polyethylene glycol (400) diglycidyl ether and ethylene glycol diglycidyl ether.

Representative polyoxazoline functionalized polymers include EPOCROS WS-500 manufactured by Nippon Shokubai.

Representative aminol crosslinking agents include triethanolamine.

Representative polycationic polymers include polyethylenimine and polyamido epichlorohydrin resins such as KYMENE 557H manufactured by Hercules, Inc.

Suitable crosslinking agents include crosslinking agents that are reactive toward the synthetic water-soluble polymer functional groups and/or the carboxyalkyl cellulose hydroxyl groups. Representative crosslinking agents that are reactive toward the carboxyalkyl cellulose hydroxyl groups include aldehyde, dialdehyde, dialdehyde sodium bisulfite addition product, dihalide, diene, diepoxide, haloepoxide, dicarboxylic acid, and polycarboxylic acid crosslinking agents. Mixtures of crosslinking agents can also be used.

Representative aldehyde crosslinking agents include formaldehyde.

Representative dialdehyde crosslinking agents include glyoxal, glutaraldehyde, and dialdehyde sodium bisulfite addition products.

Representative dihalide crosslinking agents include 1,3-dichloro-2-hydroxypropane.

Representative diene crosslinking agents include divinyl ethers and divinyl sulfone.

Representative diepoxide crosslinking agents include vinylcyclohexene dioxide, butadiene dioxide, and diglycidyl ethers such as polyethylene glycol diglycidyl ether and ethylene glycol diglycidyl ether.

Representative haloepoxide crosslinking agents include epichlorohydrin.

Representative carboxylic acid crosslinking agents include di- and polycarboxylic acids. U.S. Pat. Nos. 5,137,537, 5,183,707, and 5,190,563, describe the use of C2-C9 polycarboxylic acids that contain at least three carboxyl groups (e.g., citric acid and oxydisuccinic acid) as crosslinking agents. Suitable polycarboxylic acid crosslinking agents include citric acid, tartaric acid, malic acid, succinic acid, glutaric acid, citraconic acid, itaconic acid, tartrate monosuccinic acid, maleic acid, 1,2,3-propane tricarboxylic acid, 1,2,3,4-butanetetracarboxylic acid, all-cis-cyclopentane tetracarboxylic acid, tetrahydrofuran tetracarboxylic acid, 1,2,4,5-benzenetetracarboxylic acid, and benzenehexacarboxylic acid.

As noted above, carboxylated polymers may be crosslinking with diamines and polyamines. Depending on the diamine or polyamine, the polymers may be crosslinked through diamide crosslinks or amide/ionic crosslinks. A mixture of a first carboxylated polymer having a plurality of carboxyl groups and a second carboxylated polymer having a plurality of carboxyl groups can be treated with a triazine crosslinking activator (e.g., 2,4,6-trichloro-1,3,5-triazine, also known as cyanuric chloride, and 2-chloro-4,6-dimethoxy-1,3,5-triazine) to provide a mixture of first and second activated carboxylated polymers. In one embodiment, the mixture of activated carboxylated polymers is reacted with a diamine or polyamine having two amino groups (e.g., primary and secondary amino groups) reactive toward activated carboxyl groups of the first and second activated carboxylated polymers to form a plurality of diamide crosslinks to provide a crosslinked carboxylated polymer. In another embodiment, the mixture of activated carboxylated polymers is reacted with a diamine or polyamine having one amino group that is reactive toward the activated carboxyl groups of the first and second activated carboxylated polymers to form a plurality of amide bonds, and a second amino group (e.g., tertiary and quaternary amino groups) that is not covalently reactive toward the activated carboxyl groups of the first and second activated carboxylated polymers and forms a plurality of ionic bonds with carboxyl groups, thereby effectively crosslinking the polymers to provide a crosslinked carboxylated polymer. The term "ionic crosslink" refers to a crosslink that includes an amide bond and an ionic bond or association between an amino group and a carboxyl group. An ionic crosslink is formed by reaction of a first activated carboxyl group with a diamine or polyamine to provide a first amide, the resulting amide having a second amino group that is ionically reactive or associative toward a second carboxyl group.

It will be appreciated that mixtures and/or blends of crosslinking agents can also be used.

Crosslinking catalysts can be used to accelerate the crosslinking reaction. Suitable catalysts include acidic salts, such as ammonium chloride, ammonium sulfate, aluminum chloride, magnesium chloride, and alkali metal salts of phosphorous-containing acids.

The amount of crosslinking agent applied to the polymers can vary depending on the desired absorption characteristics. The amount of crosslinking agent applied to the polymers will depend on the particular crosslinking agent and is suitably in the range of from about 0.01 to about 8.0 percent by weight based on the total weight of the carboxyalkyl cellulose. In one embodiment, the amount of crosslinking agent applied to the polymers is in the range from about 0.50 to about 5.0 percent by weight based on the total weight of the carboxyalkyl cellulose. In one embodiment, the amount of crosslinking agent applied to the polymers is in the range from about 1.0 to about 2.0 percent by weight based on the total weight of the carboxyalkyl cellulose.

The superabsorbent compositions have a Free Swell Capacity of at least about 30 g/g. In one embodiment, the compositions have a Free Swell Capacity of from about 30 g/g to about 120 g/g.

The superabsorbent compositions have a Centrifuge Capacity of at least about 5 g/g. In one embodiment, the compositions have a Centrifuge Capacity of from about 5 g/g to about 60 g/g. In one embodiment, the compositions have a Centrifuge Capacity of from about 25 g/g to about 50 g/g.

The superabsorbent compositions have a Absorbency Under Load value of at least about 5 g/g. In one embodiment, the compositions have a Absorbency Under Load value of from about 5 g/g to about 30 g/g. In one embodiment, the compositions have a Absorbency Under Load value of from about 10 g/g to about 20 g/g.

The pulp type, Free Swell and Centrifuge Capacities, and Absorbency Under Load (AUL) for superabsorbent compositions of the invention are summarized in Table 3.

Entries 1-18 refer to superabsorbent compositions made by treating a carboxymethyl cellulose and a polyacrylic acid (10 weight percent based on CMC) with glutaraldehyde (4.3 weight percent based on all components) in water, and then evaporating. Entries 1-3 refer to superabsorbents made from commercially available carboxylmethyl cellulose (9H4F) at three levels of glutaraldehyde crosslinking agent. Entries 4-18 refer to superabsorbent compositions made by treating a carboxymethyl cellulose of the invention and a polyacrylic acid with glutaraldehyde.

Entries 19-26 refer to superabsorbent compositions made by treating a carboxymethyl cellulose of the invention and a polyacrylamide (molecular weight 5-6 million, 10 weight percent based on CMC) with glutaraldehyde (8.0 mole percent based on polyacrylamide) in water, and then precipitating the composition in excess acetone. Entries 19, 21, 23, and 25 refer to compositions made without heat treatment. Entries 20, 22, 24, and 26 refer to compositions made by heating at 150° C. for minutes.

TABLE 3

CMC/Water-soluble polymer network properties.

| | Pulp | CMC | Preparation | Free Swell g/g | Centrifuge g/g | AUL g/g |
|---|---|---|---|---|---|---|
| 1 | | 9H4F | Commercial CMC (2.2% crosslinker) | 70.0 | 48.3 | 23.6 |
| 2 | | 9H4F | Commercial CMC (4.3% crosslinker) | 74.7 | 43.2 | 22.3 |
| 3 | | 9H4F | Commercial CMC (6.3% crosslinker) | 60.5 | 45.0 | 22.5 |
| 4 | A1 | 75 | 4.3% crosslinker | 70.1 | 51.6 | 23.4 |
| 5 | B1 | 77 | 4.3% crosslinker | 65.6 | 38.9 | 22.2 |
| 6 | C1 | 78 | 4.3% crosslinker | 64.5 | 49.3 | 24.5 |
| 7 | D1 | 79 | 4.3% crosslinker | 82.2 | 43.3 | 20 |
| 8 | E1 | 80 | 4.3% crosslinker | 77.1 | 52.9 | 21.6 |
| 9 | F1 | 81 | 4.3% crosslinker | 75.3 | 56.8 | 21 |
| 10 | G1 | 82 | 4.3% crosslinker | 74.8 | 42.6 | 20.2 |
| 11 | H1 | 83 | 4.3% crosslinker | 73.3 | 48.2 | 20.5 |
| 12 | I1 | 84 | 4.3% crosslinker | 70.8 | 49.3 | 22.1 |
| 13 | J1 | 95 | 4.3% crosslinker | 80.3 | 38.8 | 21.9 |
| 14 | K1 | 96 | 4.3% crosslinker | 77.2 | 57.7 | 24.6 |
| 15 | L1 | 97 | 4.3% crosslinker | 80.4 | 28.7 | 20.5 |
| 16 | M1 | 98 | 4.3% crosslinker | 65.6 | 47.6 | 23.1 |
| 17 | N1 | 93 | 4.3% crosslinker | 81.1 | 33 | 21.8 |
| 18 | O1 | 94 | 4.3% crosslinker | 78.8 | 46.4 | 21.7 |
| 19 | A1 | 75 | No heat treatment | 95.4 | 27.4 | 22.5 |
| 20 | A1 | 75 | Heat treatment at 150 C. for 15 minute | 52.0 | 27.9 | 28.3 |
| 21 | C1 | 78 | No heat treatment | 113.5 | 32.2 | 24.4 |
| 22 | C1 | 78 | Heat treatment at 150 C. for 15 minute | 66.2 | 35.8 | 29.3 |
| 23 | E1 | 80 | No heat treatment | 79.9 | 32.0 | 26.7 |
| 24 | E1 | 80 | Heat treatment at 150 C. for 15 minute | 57.1 | 33.6 | 27.5 |
| 25 | F1 | 81 | No heat treatment | 89.3 | 31.0 | 24.0 |
| 26 | F1 | 81 | Heat treatment at 150 C. for 15 minute | 50.4 | 25.1 | 27.7 |

In further aspect, the invention provides a method for making the superabsorbent compositions described above.

In one embodiment, the method comprises treating a water-soluble carboxyalkyl cellulose and a water-soluble polymer with a crosslinking agent to provide a reaction mixture, and crosslinking the reaction mixture to provide the composition. The crosslinking agent reacts with at least one of the carboxyalkyl cellulose or the water-soluble polymer.

In another embodiment, the method comprises combining a water-soluble carboxyalkyl cellulose, a water-soluble polymer, and a crosslinking agent in an aqueous solution to provide a reaction mixture; precipitating the reaction mixture by addition of a water-miscible solvent to provide a precipitated mixture; collecting the precipitated mixture; and heating the precipitated mixture at a temperature and for a period of time sufficient to effect crosslinking to provide the composition.

In the above methods, the pulp from which the carboxyalkyl cellulose is made has a kappa value of from about 1 to about 65.

In embodiments using certain metal ions as the crosslinking agent, combining a solution of a carboxyalkyl cellulose with the metal ion (e.g., aluminum sulfate) results in precipitation of a crosslinked product at or near room temperature (i.e., about 25° C.).

In other embodiments, crosslinking can be achieved by heating at a temperature and for a period of time sufficient to effect crosslinking. Crosslinking can be achieved by heating at a temperature of about 50 to 150° C. for about 5 to 60 minutes. Crosslinking can occur during precipitation of the reaction mixture, solvent extraction of the reaction mixture, or during drying of the precipitated mixture.

In one embodiment, the method further includes combining the carboxyalkyl cellulose, the water-soluble polymer, and the crosslinking agent with a second crosslinking agent. The second crosslinking agent is different from the crosslinking agent initially combined with the carboxyalkyl cellulose and the water-soluble polymer.

Thus, in another aspect, the invention provides a polymer network obtainable from the reaction of a carboxyalkyl cellulose and a water-soluble polymer with two crosslinking agents, in which each crosslinking agent reacts with at least one of the carboxyalkyl cellulose or water-soluble polymer.

The second crosslinking agent can be any one of those described above including aldehyde, dialdehyde, dihalide, diene, diepoxide, haloepoxide, dicarboxylic acid, polycarboxylic acid, diol, diamine, arninol, inorganic cationic compound, and polycationic polymer crosslinking agents.

The second crosslinking agent is added in an amount from about 2 to about 20 mole percent based on the amount of the water-soluble polymer. In one embodiment, the second crosslinking agent is added in an amount from about 4 to about 16 mole percent based on the amount of the water-soluble polymer. In one embodiment, the second crosslinking agent is added in an amount from about 6 to about 10 mole percent based on the amount of the water-soluble polymer.

In another aspect, the invention provides absorbent products that include the carboxyalkyl cellulose described above. The carboxyalkyl cellulose can be incorporated into a personal care absorbent product. The carboxyalkyl cellulose can be included in a composite for incorporation into a personal care absorbent product. Composites can be formed to include the carboxyalkyl cellulose alone or by combining the carboxyalkyl cellulose with other materials, including fibrous materials, binder materials, other absorbent materials, and other materials commonly employed in personal care absorbent products. Suitable fibrous materials include synthetic fibers, such as polyester, polypropylene, and bicomponent binding fibers; and cellulosic fibers, such as fluff pulp fibers, crosslinked cellulosic fibers, cotton fibers, and CTMP fibers. Suitable other absorbent materials include natural absorbents, such as sphagnum moss, and conventional synthetic superabsorbents, such as polyacrylates.

Absorbent composites derived from or that include the carboxyalkyl cellulose of the invention can be advantageously incorporated into a variety of absorbent articles such as diapers including disposable diapers and training pants; feminine care products including sanitary napkins, and pant liners; adult incontinence products; toweling; surgical and dental sponges; bandages; food tray pads; and the like. Thus, in another aspect, the present invention provides absorbent composites, constructs, and absorbent articles that include the carboxyalkyl cellulose.

The carboxyalkyl cellulose can be incorporated as an absorbent core or storage layer into a personal care absorbent product such as a diaper. The composite can be used alone or combined with one or more other layers, such as acquisition and/or distribution layers, to provide useful absorbent constructs.

Figure 2:
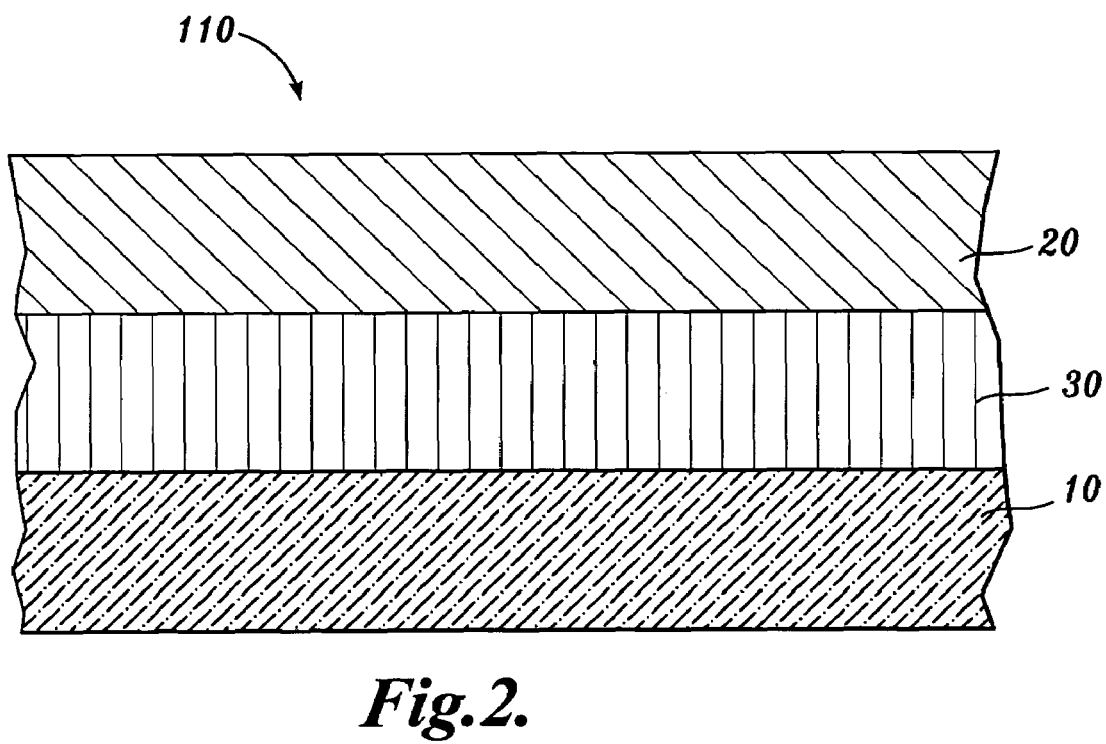
FIG. 2 is a cross sectional view of an absorbent construct incorporating a superabsorbent composition of the invention and having acquisition and distribution layers.

Representative absorbent constructs incorporating an absorbent composite that includes the carboxyalkyl cellulose of the invention are shown in FIGS. 1 and 2. Referring to FIG. 1, construct 100 includes composite 10 (i.e., a composite that includes the carboxyalkyl cellulose) employed as a storage layer in combination with an upper acquisition layer 20.

In addition to the construct noted above that includes the combination of absorbent composite and acquisition layer, further constructs can include a distribution layer intermediate the acquisition layer and composite. FIG. 2 illustrates construct 110 having intermediate layer 30 (e.g., distribution layer) interposed between acquisition layer 20 and composite 10.

Figure 3A:
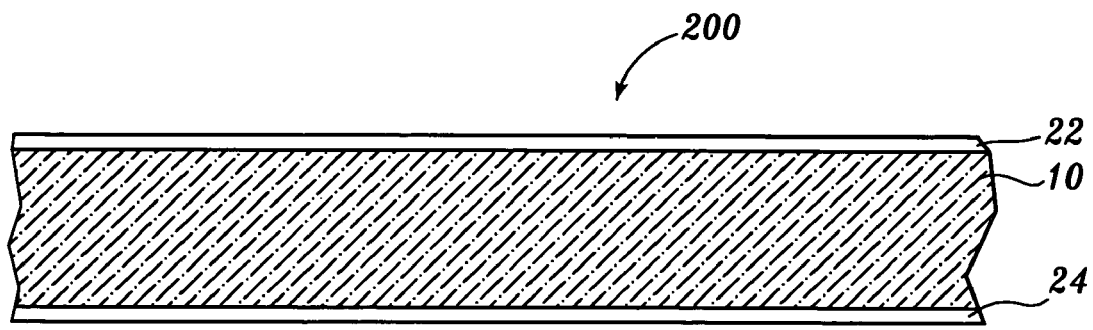
FIGS. 3A-C are cross sectional views of absorbent articles incorporating a composite including a superabsorbent composition of the invention and the absorbent constructs illustrated in FIGS. 1 and 2, respectively.
Figure 3B:
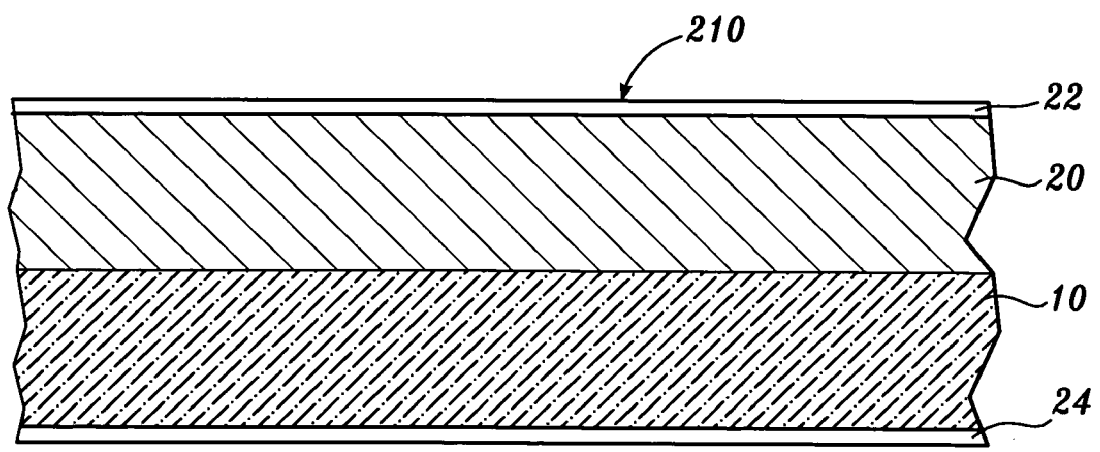
Figure 3C:
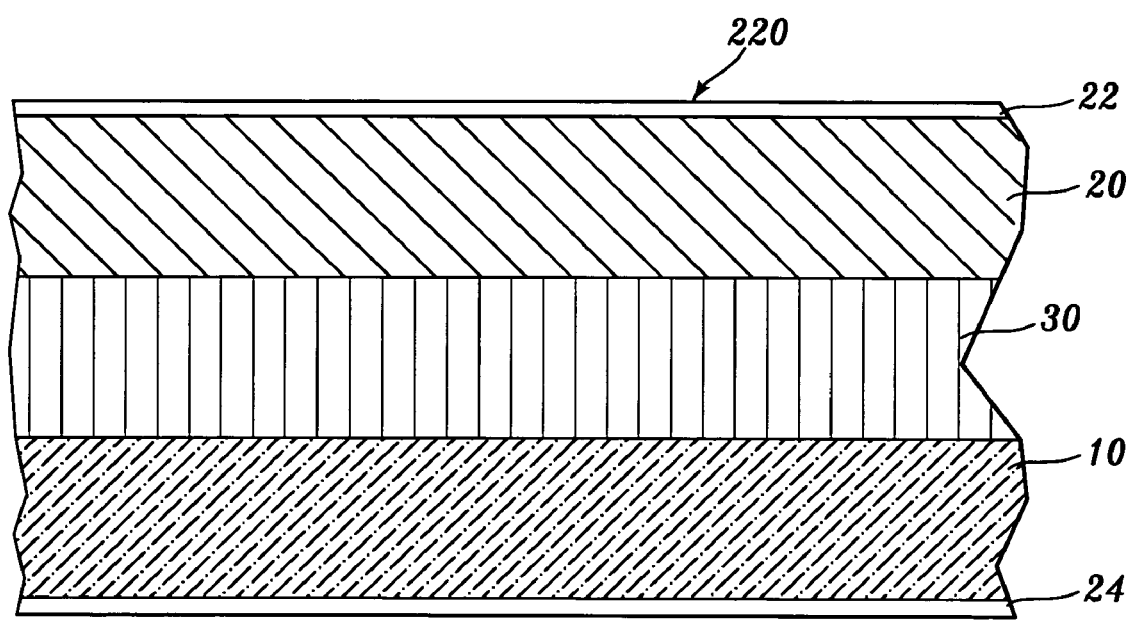

Composite 10 and constructs 100 and 110 can be incorporated into absorbent articles. Generally, absorbent articles 200, 210, and 220 shown in FIGS. 3A-C, include liquid previous facing sheet 22, liquid impervious backing sheet 24, and a composite 10, construct 100, or construct 110, respectively. In such absorbent articles, the facing sheet can be joined to the backing sheet.

It will be appreciated that other absorbent products can be designed incorporating the carboxyalkyl cellulose and composites that include the carboxyalkyl cellulose.

The following examples are provided for the purpose of illustrating, not limiting, the invention.

EXAMPLES

Example 1

General Procedure for Making Carboxymethyl Cellulose

In this example, a general procedure for making a representative carboxymethyl cellulose of the invention is described.

Lightly bleached, never dried kraft pulp (25.0 g, oven dried) was mixed with isopropanol (1.39 L) under nitrogen environment at 0° C. for 30 min. A sodium hydroxide solution (40.56 g in water with a total weight of 94.74 g) was added dropwise over 30 minutes and the reaction was left to stir for 1 h. A solution of monochloroacetic acid (22.69 g) in isopropanol (55.55 mL) was added dropwise to the stirring pulp over 30 min while the reaction temperature was increased to 55° C. The reaction was stirred for 3 h and then filtered, placed in 2 L 70/30 methanol/water solution, and neutralized with acetic acid. The resulting slurry was collected by filtration, washed one time each with 2 L 70/30, 80/20, and 90/10 ethanol/water solutions, and then finally with 100% methanol to provide the product carboxymethyl cellulose.

Example 2

Representative Procedure for Making Carboxymethyl Cellulose

Unbleached Pulp

In this example, a representative procedure for making a carboxymethyl cellulose from unbleached pulp is described.

Unbleached pulp (Weyerhaeuser Company, Port Wentworth mill designated PW-04 and having 7.4 percent by weight xylan, 5.6 percent by weight mannan, and 6.25 percent by weight lignin) (24 g with 41.7% consistency) was mixed with 200 g isopropanol and 6 g sodium hydroxide. Then, 11 g monochloroacetic acid was added and the mixture heated at 70° C. for 3.5 hours. The product carboxymethyl cellulose was washed with alcohol and then sheeted before drying. The carboxymethyl cellulose had a Free Swell Capacity of 17.15 g/g, a Centrifuge Capacity of 6.38 g/g, and an AUL (sheet) of 6.53 g/g.

Example 3

Representative Procedure for Making Carboxymethyl Cellulose

Low Brightness Pulp

In this example, a representative procedure for making a carboxymethyl cellulose from low brightness pulp is described.

Several never-dried pulps having low brightness at 25% consistency (40 g) were mixed with 160 g isopropanol, varying amounts of 50% aqueous sodium hydroxide, and 42 g monochloroacetic acid and heated at 65° C. for 3.5 hours following the general procedure described in Example 2. The properties of the product carboxymethyl celluloses are presented in Table 1 (CMC H, I, and J).

Example 4

In this example, a method for determining free swell capacity (g/g) and centrifuge capacity (g/g) is described.

The materials, procedure, and calculations to determine free swell capacity (g/g) and centrifuge capacity (g/g) were as follows.

Test Materials:

Japanese pre-made empty tea bags (available from Drugstore.com, IN PURSUIT OF TEA polyester tea bags 93 mm×70 mm with fold-over flap. (http:www.mesh.ne.jp/tokiwa/).

Balance (4 decimal place accuracy, 0.0001 g for air-dried superabsorbent polymer (AD SAP) and tea bag weights).

Timer.

1% Saline.

Drip rack with clips (NLM 211)

Lab centrifuge (NLM 211, Spin-X spin extractor, model 776S, 3,300 RPM, 120 v).

Test Procedure:

1. Determine solids content of AD SAP.
2. Pre-weigh tea bags to nearest 0.0001 g and record.
3. Accurately weigh 0.2025 g+/−0.0025 g of test material (SAP), record and place into pre-weighed tea bag (air-dried (AD) bag weight). (AD SAP weight+AD bag weight=total dry weight).
4. Fold tea bag edge over closing bag.
5. Fill a container (at least 3 inches deep) with at least 2 inches with 1% saline.
6. Hold tea bag (with test sample) flat and shake to distribute test material evenly through bag.
7. Lay tea bag onto surface of saline and start timer.
8. Soak bags for specified time (e.g., 30 minutes).
9. Remove tea bags carefully, being careful not to spill any contents from bags, hang from a clip on drip rack for 3 minutes.
10. Carefully remove each bag, weigh, and record (drip weight).
11. Place tea bags onto centrifuge walls, being careful not to let them touch and careful to balance evenly around wall.
12. Lock down lid and start timer. Spin for 75 seconds.
13. Unlock lid and remove bags. Weigh each bag and record weight (centrifuge weight).

Calculations:

The tea bag material has an absorbency determined as follows:

Free Swell Capacity, factor=5.78
Centrifuge Capacity, factor=0.50
Z=Oven dry SAP wt (g)/Air dry SAP wt (g)
Free Capacity (g/g):

$$\frac{[(\text{drip wt (g)} - \text{dry bag wt (g)}) - (AD\ SAP\ \text{wt (g)})] - (\text{dry bag wt (g)} * 5.78)}{(AD\ SAP\ \text{wt (g)} * Z)}$$

Centrifuge Capacity (g/g):

$$\frac{[\text{centrifuge wt (g)} - \text{dry bag wt (g)} - (AD\ SAP\ \text{wt (g)})] - (\text{dry bag wt (g)} * 0.50)}{(AD\ SAP\ \text{wt} * Z)}$$

Example 5

Method for Determining Absorbency Under Load (AUL)

In this example, a method for determining Absorbency Under Load (AUL) is described.

Figure 4:
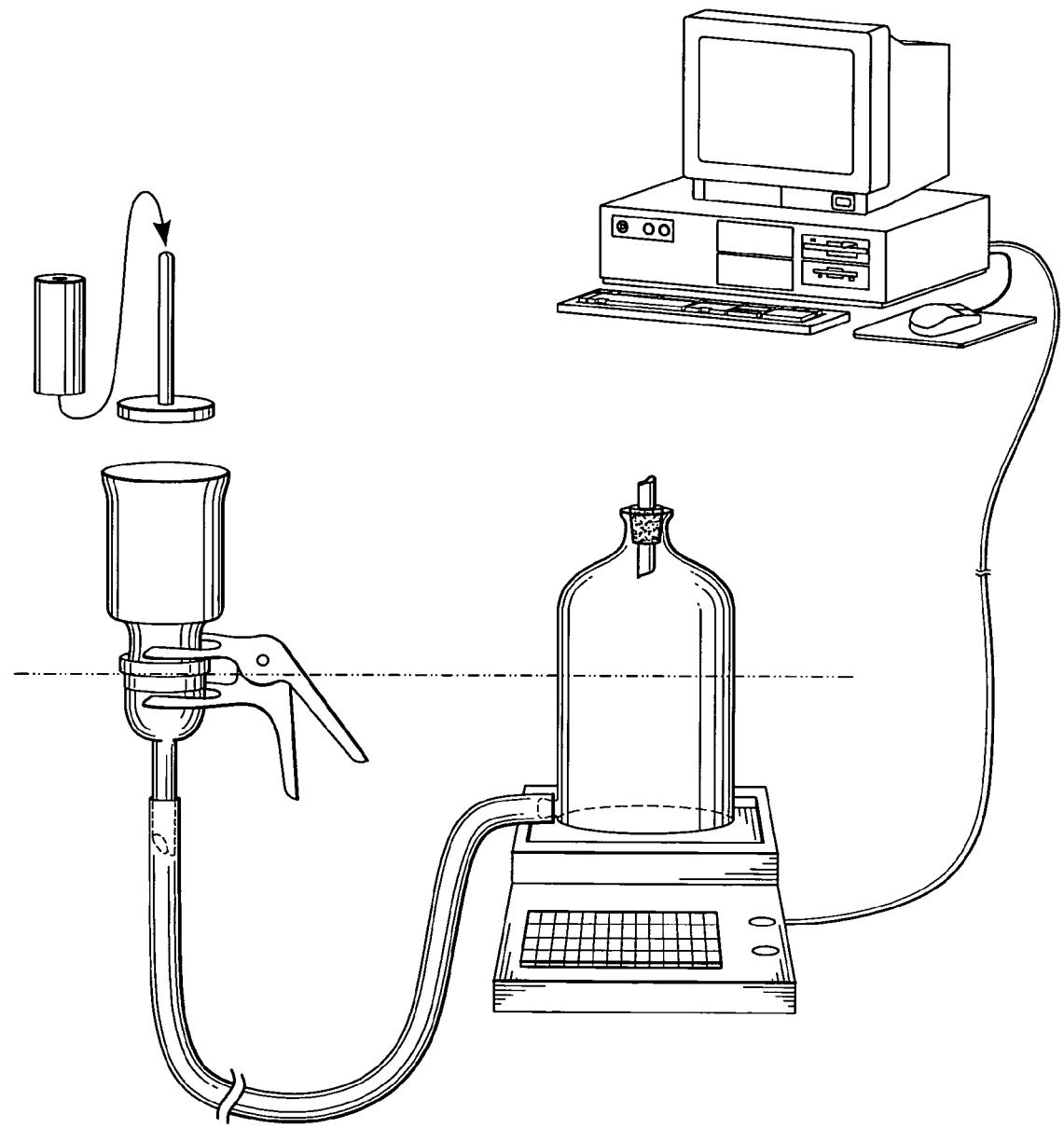
FIG. 4 is a schematic illustration of a device for measuring Absorbency Under Load (AUL) values.

The materials, procedure, and calculations to determine AUL were as follows. Reference is made to FIG. 4.

Test Materials:

Mettler Toledo PB 3002 balance and BALANCE-LINK software or other compatible balance and software. Software set-up: record weight from balance every 30 sec (this will be a negative number. Software can place each value into EXCEL spreadsheet.

Kontes 90 mm ULTRA-WARE filter set up with fritted glass (coarse) filter plate. clamped to stand.

2 L glass bottle with outlet tube near bottom of bottle.

Rubber stopper with glass tube through the stopper that fits the bottle (air inlet).

TYGON tubing.

Stainless steel rod/plexiglass plunger assembly (71 mm diameter).

Stainless steel weight with hole drill through to place over plunger (plunger and weight=867 g)

VWR 9.0 cm filter papers (Qualitative 413 catalog number 28310-048) cut down to 80 mm size.

Double-stick SCOTCH tape.

0.9% Saline.

Test Procedure:
1. Level filter set-up with small level.
2. Adjust filter height or fluid level in bottle so that fritted glass filter and saline level in bottle are at same height.
3. Make sure that there are no kinks in tubing or air bubbles in tubing or under fritted glass filter plate.
4. Place filter paper into filter and place stainless steel weight onto filter paper.
5. Wait for 5-10 min while filter paper becomes fully wetted and reaches equilibrium with applied weight.
6. Zero balance.
7. While waiting for filter paper to reach equilibrium prepare plunger with double stick tape on bottom.
8. Place plunger (with tape) onto separate scale and zero scale.
9. Place plunger into dry test material so that a monolayer of material is stuck to the bottom by the double stick tape.
10. Weigh the plunger and test material on zeroed scale and record weight of dry test material (dry material weight 0.15 g+/−0.05 g).
11. Filter paper should be at equilibrium by now, zero scale.
12. Start balance recording software.
13. Remove weight and place plunger and test material into filter assembly.
14. Place weight onto plunger assembly.
15. Wait for test to complete (30 or 60 min)
16. Stop balance recording software.

Calculations:

A=balance reading (g) * −1 (weight of saline absorbed by test material)

B=dry weight of test material (this can be corrected for moisture by multiplying the AD weight by solids %).

AUL (g/g)=A/B (g 1% saline/1 g test material)

Example 6

Method for Determining Pulp Sugar/Lignin from Wood Pulp

In this example, a method for determining pulp sugar/lignin from wood pulp by high performance liquid chromatography is described. The method measures concentrations of pulp sugars from 0.01% to 100%.

In the method, polymers of pulp or wood sugars are converted to monomers by sulfuric acid digestion. Pulp is ground, weighed, hydrolyzed with sulfuric acid, diluted to 200-mL final volume, filtered (residue solid is considered as lignin), diluted again (1.0 ml+8.0 ml $H_2O$) and analyzed with high performance liquid chromatography (HPLC).

Chromatography Equipment.

GP 50 Dionex metal free gradient pump with four solvent inlets.

Dionex ED 40 pulsed amperometric detector with gold working electrode and solid state reference electrode.

Dionex autosampler AS 50 with a thermal compartment containing all the columns, the ED 40 cell and the injector loop.

Dionex PC10 Pneumatic Solvent Addition apparatus with IL plastic bottle.

Helium tank, minimum 99.99%.

4×2 L Dionex polyethylene solvent bottles with solvent outlet and helium gas inlet caps.

CarboPac PA1 (Dionex P/N 035391) ion exchange column 4 mm×250 mm.

CarboPac PA1 guard column (Dionex P/N 043096) 4 mm×50 mm.

Amino trap column (Dionex P/N 046122) 4 mm×50 mm.

Millipore solvent filtration apparatus with Type HA 0.45 u filters.

Chromatography Reagents.

Distilled deionized water.

JT Baker 50% sodium hydroxide solution.

2 M stock solution of JT Baker sodium acetate trihydrate Ultrapure Bioreagent (136.1 g/L).

Procedure.

Sample preparation as described by digestion method described in Example 7.

Note: All references to $H_2O$ is Millipore $H_2O$.

Solvent preparation.

Solvent A is distilled and deionized water sparged with helium for 20 minutes before installing under a blanket of helium.

Solvent B is 2 L of 400 mM NaOH. 1960 mL water is sparged with helium for 20 minutes. 41.6 mL 50% NaOH is added with a 50 mL plastic pipette while still sparging. Minimize disturbance of the 50% NaOH, and draw it from the middle of the liquid. This ensures that $Na_2CO_3$ contamination is reduced. Use the sparger to mix the reagent, then transfer the bottle to the solvent B position and blanket with helium.

Solvent D is 200 mM sodium acetate. Weigh 49 g sodium acetate trihydrate (J.T. Baker Ultrapure Bioreagent) into about 1500 mL water. Stir on stirplate until dissolved. Adjust to 1800 mL Filter this into a 2000 mL sidearm flask using the Millipore filtration apparatus with a 0.45 u Type HA membrane. Add this to the solvent D bottle, then sparge with helium for 20 minutes. Transfer the bottle to the solvent D position and blanket with helium.

The solvent addition solvent is 1 L of 200 mM NaOH. This is added postcolumn to enable the detection of sugars as anions at pH 14. Add 10.4 mL of 50% NaOH to 1 L water. If enough reagent is left over from the previous run, 500 mL water plus 5.2 mL 50% NaOH may be used. Add the reagent to the PC10 Pneumatic Solvent Addition apparatus.

Chromatograph Setup. (Use select keys on instrument panel to toggle between remote/local and direct/schedule control.)

With pump flow composite set at solvent A 40%, solvent B 30% and solvent D 30%, set flow rate to 1 mL/min. Open pressure transducer waste valve, then the Priming Block Luer Port valve. Enable the Prime function and draw off ~10 ML solvent with a plastic syringe. Disable the Prime function, close purge valve and then close drawoff valve. Repeat twice more.

Set pump to 50/50 Solvent A/Solvent B. Run at 1 mL/min for 20 minutes to wash the column, or 0.2 mL/min for a couple of hours. Turn on the ED40 detector cell. Set the temperature function on the AS50 to 25° C.

Set up the AS 50 schedule. All PeakNet main Menu files relevant to pulp sugars are in the psugar folder with subfolders Methods, Schedules and Data. The schedules have the extension .sas. Use a prior schedule as a template. Three injections of an $H_2SO_4$ blank (diluted to the same concentration as the samples) are made first; all other vials have one injection each. Injection volume is 5 uL for all samples, injection type is "Partial", cut volume is 10 uL, syringe speed is 3, all samples and standards are of Sample Type "Sample", the current instrument method is sugarsgradient4.met, the data file storage label is "data", and Dilution, Weight and Int. Std. values are all set equal to 1.

Run the four standards at the beginning and the end of sample sets with more than four samples.

Run Samples.

Turn the solvent addition pump switch on and click on the baseline icon. Using the PC 10 pressure dial, adjust the total flow rate to 1.5 mL/min with a 5 mL graduated cylinder and a stop watch (1 mL/min from the column and 0.5 mL/min for the solvent addition eluant). Measure flow for 2.0 min. to get 3.0 mL in the cylinder.

After the baseline has been established, click the "Run" icon.

After the run has finished, change the autosampler, the ED 40 and the pump to local and direct control. Change the oven temperature to 20° C., and let flow continue for a few minutes until the oven cools down. Change the pump flow to 1 mL/min at 100% water for a few minutes and rinse NaOH from the pump heads with distilled water.

Calculation.

$$\text{Normalized area for sugar} = \frac{(\text{Area sugar}) * (\mu g/mL \text{ fucose})}{(\text{Area fucose})}$$

Normalized areas are plotted as y values vs. the sugar concentration x values in µg/mL. The spreadsheet function calculates the slope and the intercept for the standard curve, with zero not included as a point.

$$\text{Amount sugar } (\mu g/mL) = \frac{((\text{Normalized area for sugar}) - (\text{intercept}))}{(\text{slope})}$$

Example 7

Method for Preparing Wood Pulp for Analysis of Pulp Sugars by Chromatography

In this example, a method for preparing wood pulp for analysis of pulp sugars by chromatography is described.

This method is applicable for the preparation of wood pulp for the analysis of pulp sugars with high performance liquid chromatography.

Polymers of pulp or wood sugars are converted to monomers by sulfuric acid digestion. Pulp is ground, weighed, hydrolyzed with sulfuric acid, diluted to 200-mL final volume, filtered, diluted again (1.0 mL+8.0 mL $H_2O$) in preparation for analysis by high performance liquid chromatography (HPLC).

60-100 mg of sample is the minimum required for a single analysis. 1-2 grams are preferred to avoid errors related to homogeneity.

Sample Handling. None for the air-dried sample. If the sample is wet, allow it air dry or put it in the oven at 25+/−5° C. until dried.

Equipment.

Autoclave.

10-mL polyethylene vials for chromatography method.

Gyrotory Water-Bath Shaker, Model G76.

Balance capable of weighing to ±0.01 mg, such as Mettler HL52 Analytical Balance.

Intermediate Thomas-Wiley Laboratory Mill, 20 mesh screen.

NAC 1506 vacuum oven.

Brinkman Chemical-resistant bottletop dispenser, 5-mL capacity.

50-mL bottletop dispenser, EM Sciences.

10-mL plastic disposable syringes, VWR.

Aluminum foil cut into 6 cm squares.

Kimwipes cut into 5 cm squares.

16-µ amber glass storage vials.

0.45-µ GHP filters, Gelman.

Adjustable 1-mL positive displacement pipette and tips, Gilson.

Heavy-walled test tubes with pouring lip, 2.5×20 cm.

Reagents.

72% Sulfuric Acid Solution ($H_2SO_4$)—transfer 183 ml of water into a 2-L Erlenmeyer flask. Pack the flask in ice bath and allow to cool. Slowly and cautiously pour, with swirling, 470 ml of 96.6% $H_2SO_4$ into the flask.

Fucose, internal standard. 2.0+/−1 g of Fucose [2438-80-4] is dissolved in 100.0 ml $H_2O$ giving a concentration of 20.0+/−1 mg/ml. This standard is stored in the LC refrigerator.

Dissolving Pulp standard—T510 Control pulp.

Kraft control pulp standard.

Weigh each sugar separately to 4 significant digits in mg and transfer to a 100-ml volumetric flask. Dissolve sugars in a small amount of water. Take to volume with water, mix well and transfer contents to a clean, 4-oz. amber bottle.

Kraft Pulp Standard Stock Solution. Weigh each sugar separately to 4 significant digits in mg and transfer to a 100-ml volumetric flask. Dissolve sugars in a small amount of water. Take to volume with water, mix well and transfer contents to a clean, 4-oz. amber bottle.

Procedure.

All references to $H_2O$ is Millipore $H_2O$.

Sample Preparation. Grind ~0.5-1 g pulp with Wiley Mill 20 Mesh screen size collecting ground sample in 50-mL beaker. Place 200 mg of sample (in duplicate, if requested) in 40-mL TEFLON container. Place in the NAC 1506 vacuum oven. Latch door. Close bleeding valve (on top of vacuum oven on left). Turn on temperature switch, checking for proper temperature setting. Open vacuum valve (on top of vacuum oven on right). Open main vacuum valve. Dry in the vacuum oven overnight at 50+/−5° C. at 125 mm Hg.

Turn off main vacuum valve and oven vacuum valve. Open bleeding valve. Turn off the temperature switch. Wait for the pressure to return to 760 mm Hg.

Remove samples from vacuum oven. Cool samples in the dessicator for 30 min.

Remove the standards from the refrigerator and allow to come to room temperature.

Turn on heat for Gyrotory Water-Bath Shaker. The settings are as follows:

Heat: High

Control Thermostat: 30° C.

Safety thermostat: 25° C.

Speed: 1.48

Shaker: Off

Check the bath-water level and fill if necessary so that the samples are below the water level.

Tare TEFLON container and sample to 0.000. Using tweezers, place 60-100 mg sample into a 100-mL test tube. Reweigh the container and sample and record the negative weight.

Add 1.0 mL 72% $H_2SO_4$ to test tube with the Brinkman dispenser. Stir with the rounded end of a stirring rod for one minute being sure to get all the fibers wet and crush all clumps.

Place the test tube in gyrotory water-bath shaker. Stir each sample 3 times, once between 20-40 min, again between 40-60 min, and again between 60-80 min. Remove the sample after 90 min.

While the samples are heating, calibrate the Brinkman dispenser for dispensing 28 mL of water. Tare a beaker to 0.00 g. Dispense 28±0.1 g water. Weigh water and adjust the Brinkmann dispenser accordingly.

At 90 min, rinse the stirring rod into sample with 28±0.1 g $H_2O$.

Calibrate automatic pipette to 1±0.001 mL. Dispense 1.000 mL of internal standard (Fucose) into sample. Vortex mix the solution.

Tightly cover with aluminum foil to be sure that the foil does not come off in the autoclave.

Close drain on autoclave. Add 4 L of water to autoclave. Place the test tube rack with samples and standards on the shelf in the autoclave. Close and lock the door. Set timer to '0'. The timer will be set for 60 min. Check autoclave after 20 minutes to be sure the pressure is 14-16 psi (95-105 kPa) and the temperature is >260 ° F. (127° C.).

After 75 minutes, remove the samples from the autoclave.

Cool the samples for one hour.

Pour the sample into a 200-mL volumetric flask. Using a calibrated Brinkmann Dispenser, rinse sides of test tube with 28.0-mL aliquot of $H_2O$. Vortex. Pour into the volumetric flask. Repeat with two more aliquots of $H_2O$, rinsing the side of the test tube. A calibrated volume of dispenser water is used before digesting so that each sample and standard are treated exactly the same way. After digesting, the dispenser is already set at 28.0 mL. Rinsing with this amount insures that the side of the test tube is rinsed well.

Bring the flask to final volume pouring $H_2O$ from a beaker into the flask and adjusting meniscus with disposable pipette. Stopper, invert and shake 3 times.

Calibrate Brinkmann Dispenser to 8.0±0.01 mL. Dispense 8.0 mL of $H_2O$ into a Dionex vial.

Filter an aliquot of the sample into labeled 16-mL amber vial through GHP 0.45-μ filter with disposable 10-mL syringe. Transfer the label from the volumetric flask to the vial.

Add 1.000 mL aliquot of the sample with a 1.000-mL syringe into the Dionex vial. Cap the Dionex and amber vials.

Kraft Pulp Standards:

In four 25-mL volumetric flasks, add Kraft Pulp Standard respectively:
0.400 mL
0.800 mL
1.200 mL
1.600 mL Add 125 μL of 72% $H_2SO_4$ to each standard. Add 125 μL of Fucose internal standard to each standard. Add 7 mL of $H_2O$ to each standard. Cover with aluminum foil and autoclave with the samples.

Bring to final volume with $H_2O$.

Filter the standard into a labeled 16-mL amber vial through a GHP filter with a disposable 10-mL syringe.

Add 1.000 mL of the standard with 1.000-mL syringe to 8.0 mL of $H_2O$ in the Dionex vial. Cap the Dionex and amber vials.

T510 Control Dissolving Pulp Standards:

In four 25-mL volumetric flasks, add T510 Control Dissolving Pulp Stock respectively:
0.400 mL
0.800 mL
1.200 mL
1.600 mL Add 125 μL of 72% $H_2SO_4$ to each standard. Add 125 μL of Fucose internal standard to each standard. Add 7 mL of $H_2O$ to each standard. Cover with aluminum foil and autoclave with the samples. Bring to final volume with $H_2O$.

Filter standard into a labeled 16-mL amber vial through a GHP filter with a disposable 10-mL syringe. Add 1.0 mL of the standard with a 1.0-mL Hamilton syringe to 8.0 mL $H_2O$ in the Dionex vial. Cap the Dionex and amber vials.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for making a carboxyalkyl cellulose product, comprising treating an unbleached or lightly bleached kraft pulp containing lignin and cellulose and having a kappa value of from 7.7 to 65 with a carboxyalkylating agent to provide carboxyalkyl cellulose and lignin or carboxyalkyl lignin.

2. The method of claim 1, wherein the kraft pulp is a never-dried kraft pulp.

3. The method of claim 1, wherein the carboxyalkylating agent is chloroacetic acid, a chloroacetic acid salt, 3-chloropropionic acid, or a 3-chloropropionic acid salt.

4. The method of claim 1, wherein the carboxyalkyl cellulose has a degree of carboxy substitution from about 0.4 to about 1.4.

5. The method of claim 1, wherein the kraft pulp has a lignin content of from 1 to 8.45 percent by weight of the cellulose.

6. The method of claim 1, wherein the kraft pulp has a hemicellulose content of from 0.1 to 17 percent by weight of the cellulose.

7. The method of claim 1 further comprising crosslinking the carboxyalkyl cellulose to provide a crosslinked carboxyalkyl cellulose.

8. A method for making a carboxyalkyl cellulose product, comprising:
(a) alkalizing an unbleached or lightly bleached kraft pulp containing lignin and cellulose and having a kappa value of from 7.7 to 65 to provide an alkalized kraft pulp; and
(b) etherifying the alkalized kraft pulp with a carboxyalkylating agent to provide carboxyalkyl cellulose and lignin or carboxyalkyl lignin.

9. The method of claim 8, wherein the kraft pulp is a never-dried kraft pulp.

10. The method of claim 8, wherein the carboxyalkylating agent is chloroacetic acid, a chloroacetic acid salt, 3-chloropropionic acid, or a 3-chloropropionic acid salt.

11. The method of claim 8, wherein the carboxyalkyl cellulose is carboxymethyl cellulose or carboxyethyl cellulose.

12. The method of claim 8, wherein the carboxyalkyl cellulose has a degree of carboxy substitution from about 0.4 to about 1.4.

13. The method of claim 8, wherein the kraft pulp has a lignin content of from 1 to 8.45 percent by weight of the cellulose.

14. The method of claim 8, wherein the pulp has a hemicellulose content of from 0.1 to 17 percent by weight of the cellulose.

15. The method of claim 8 further comprising crosslinking the carboxyalkyl cellulose to provide a crosslinked carboxyalkyl cellulose.

16. A method for making a carboxyalkyl cellulose product, comprising:
   (a) crosslinking an unbleached or lightly bleached kraft pulp containing lignin and cellulose and having a kappa value of from 7.7 to 65 to provide a crosslinked kraft pulp;
   (b) alkalizing the crosslinked kraft pulp to provide an alkalized kraft pulp; and
   (c) etherifying the alkalized kraft pulp with a carboxyalkylating agent to provide carboxyalkyl cellulose and lignin or carboxyalkyl lignin.

17. The method of claim 16, wherein the kraft pulp is a never-dried kraft pulp.

18. The method of claim 16, wherein the carboxyalkylating agent is chloroacetic acid, a chloroacetic acid salt, 3-chloropropionic acid, or a 3-chloropropionic acid salt.

19. The method of claim 16, wherein the carboxyalkyl cellulose is carboxymethyl cellulose or carboxyethyl cellulose.

20. The method of claim 16, wherein the carboxyalkyl cellulose has a degree of carboxy substitution from about 0.4 to about 1.4.

* * * * *